(12) United States Patent
Hostettler

(10) Patent No.: US 7,197,744 B2
(45) Date of Patent: Mar. 27, 2007

(54) UNIVERSAL SCRIPT EDITOR

(75) Inventor: Randy W. Hostettler, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 639 days.

(21) Appl. No.: 10/116,602

(22) Filed: Apr. 4, 2002

(65) Prior Publication Data

US 2003/0192030 A1 Oct. 9, 2003

(51) Int. Cl.
*G06F 9/44* (2006.01)

(52) U.S. Cl. .................................... 717/125

(58) Field of Classification Search ............... 717/105, 717/113, 124, 125; 715/513, 709, 717, 733, 715/744, 760, 762, 809, 810, 853; 707/102, 707/6, 104.1; 716/2, 16, 18
See application file for complete search history.

(56) References Cited

U.S. PATENT DOCUMENTS

| | | | |
|---|---|---|---|
| 5,950,002 | A | 9/1999 | Hoford et al. |
| 6,002,871 | A * | 12/1999 | Duggan et al. ............ 717/135 |
| 6,311,320 | B1 * | 10/2001 | Jibbe ........................ 717/111 |
| 6,775,824 | B1 * | 8/2004 | Osborne et al. ........... 717/125 |
| 2003/0060896 | A9 * | 3/2003 | Hulai et al. ................. 700/1 |

FOREIGN PATENT DOCUMENTS

WO          WO 03/001364 A1     1/2003

OTHER PUBLICATIONS

EVR Soft Introduction—Copyright 1998-2001 Envision Visual Reality & Evrsoft. http://www.evrsoft.com/1stpage.
Power Tools: 1st Transfer FTP—Copyright 1998-2001 Envision Visual Reality & Evrsoft. http://www.evrsoft.com/1stpage/tools.shtml.
Scripting Technologies:iScripts(TM)—Copyright 1998-2001 Envision Visual Reality & Evrsoft. http://www.evrsoft.com/1stpage/iscripts.shtml.
IDM Computer Solutions Inc; "UltraEdit Features," www.ultraedit.com, 'Online!, Feb. 4, 2002, retrieved Jan. 21, 2004, p. 1, paragraph 1-p. 2, paragraph 1; p. 4, paragraph 1; p. 6, paragraph 3.

* cited by examiner

*Primary Examiner*—Kakali Chaki
*Assistant Examiner*—Tuan A. Vu
(74) *Attorney, Agent, or Firm*—Ingrassia Fisher & Lorenz

(57) ABSTRACT

A universal script editor for creating scripts with arbitrary syntax includes a read module and an editor module. For a given script type, the read module reads in a configuration file that includes a menu structure with associated menu items and at least one of a location/name of a file containing a script command structure or a self-contained script command structure. The read module sets up one or more menus, which support editing functions for building scripts for a current project, based upon the configuration file. The editor module, which is in communication with the read module, supports a plurality of editor capabilities which are utilized to build current project scripts.

15 Claims, 4 Drawing Sheets

UNIVERSAL SCRIPT EDITOR

BACKGROUND OF THE INVENTION

The present invention is generally directed to a script editor and, more specifically, to a universal script editor for creating scripts with arbitrary syntax.

Today, many software and/or hardware development activities use some kind of script interpreter/script compiler engine, which takes a set of textual script command/data structures and interprets/compiles the commands/data structures and provides appropriate processing of the commands/data. For example, a personal computer (PC) with a 1553 card may have a script interpreter engine that takes a file of commands and converts the commands into 1553 I/O messages, data comparisons and pass/fail checks, thereby, controlling and monitoring a system under test. Tool command language (TCL) is one such script interpreter engine that has been used for controlling and monitoring a system under test.

While standard editors are often used to support the generation of executable scripts, such standard editors are generally inefficient as they have no knowledge of the specifics of the system under test. Alternatively, custom editor applications have been written that support a project-defined command syntax. However, creating/maintaining custom editors can become costly and time-consuming as command syntax is often unique and quite different from one project to the next project.

Thus, what is needed is a universal script editor that can be used for creating scripts with arbitrary syntax.

SUMMARY OF THE INVENTION

The present invention is generally directed to a universal script editor for creating scripts with arbitrary syntax. The universal script editor includes a read module for reading in one or more configuration files and an editor module that is in communication with the read module. A configuration file includes a definition of a menu structure with associated menu items and at least one of a location/name of a file containing a script command structure and a self-contained script command structure. The read module sets up one or more menu systems, which support editing functions for building scripts for a current project, based upon the configuration file associated with each file type being edited. The editor module supports a plurality of editor capabilities, which are utilized to build current project scripts.

According to another embodiment of the present invention, the universal script editor also includes a miscellaneous support module that provides additional editor capabilities, which may include keyword highlighting, automatic indentation and outline viewing.

According to another embodiment of the present invention, the editing functions may include cutting, pasting, font selection, page numbering and column numbering.

These and other features, advantages and objects of the present invention will be further understood and appreciated by those skilled in the art by reference to the following specification, claims and appended drawings.

BRIEF DESCRIPTION OF THE DRAWINGS

FIG. 2 is a screen dump of an exemplary menu that has been customized through the use of a configuration file, according to an embodiment of the present invention;

FIG. 3 is a screen dump of another exemplary menu that has been customized through the use of a configuration file, according to another embodiment of the present invention.

DETAILED DESCRIPTION OF THE PREFERRED EMBODIMENT(S)

Figure 1:
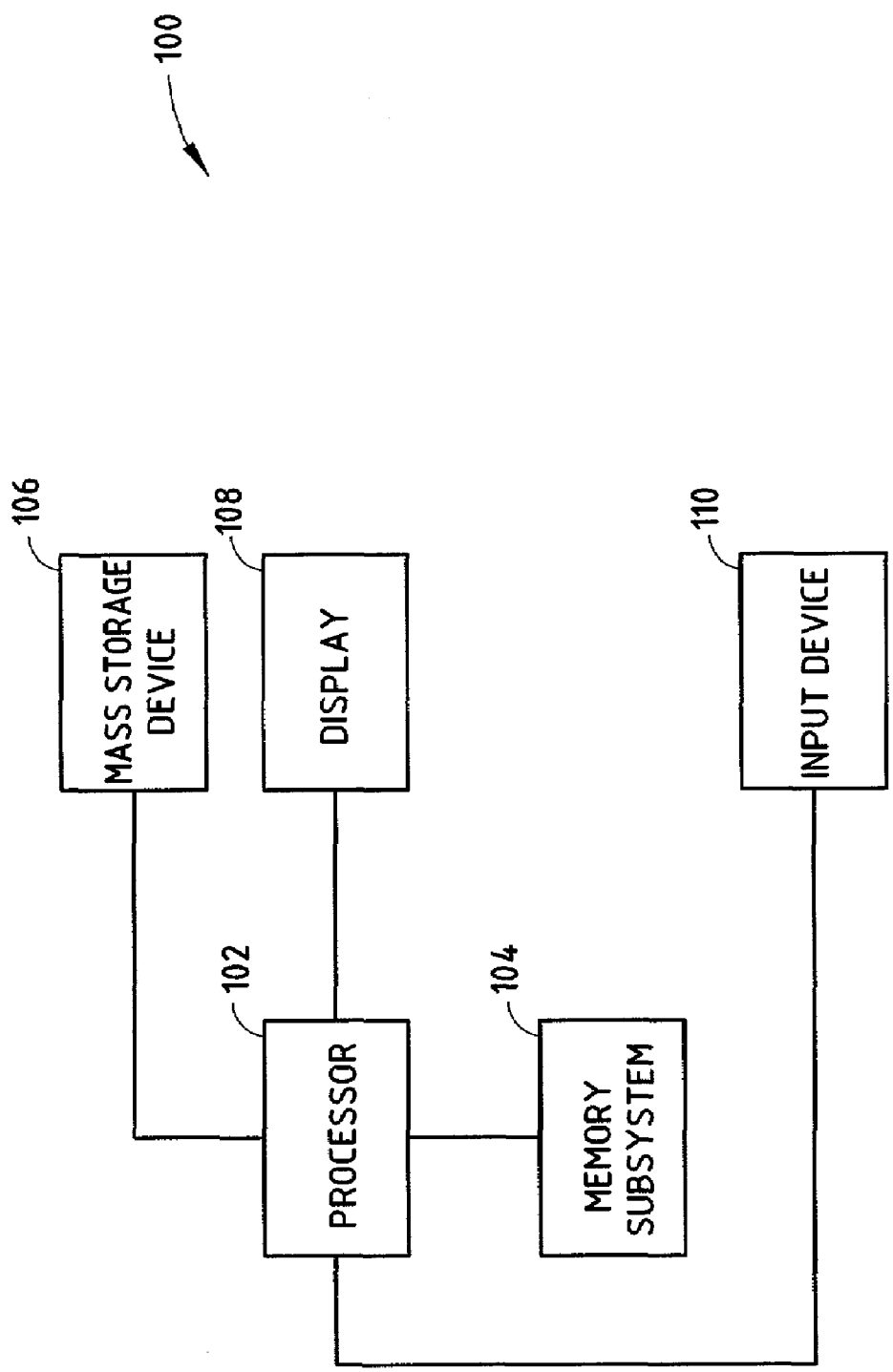
FIG. 1 is a block diagram of an exemplary system for executing a universal script editor for creating scripts with arbitrary syntax, according to an embodiment of the present invention.

The present invention is directed to a software application that takes the form of a customizable universal script editor. According to the present invention, the script editor utilizes a configuration file to configure a set of menus that are specific to a project—with a menu structure, command names, command source files and other options defined by a user. More than one menu system can be defined, with each menu system associated with the type of the file being edited. These menus can then be used to rapidly build-up scripts for a current project using a general purpose editing window provided by the script editor. Changing from one project to another project, or one file type to another, with a different syntax, command structure and/or menu structures is simply a matter of creating a different configuration file and any supporting script templates, and reading the configuration file into the script editor.

The configuration file may identify user created individual or multi-command script text files of an appropriate syntax for each command/function that a user supplied script interpreter engine requires. In this manner, the configuration file identifies menu/command names and structures and may include locations and names of files and/or text containing commands for a user's system. A project specific configuration file can provide the information to the script editor in a variety of ways. For example, the configuration file may provide the location/names of the files containing the project specific and/or generic script command structures. Alternatively, or in addition, the command text can be contained within the configuration file.

The configuration file also defines a menu structure for the project, i.e., the number of menus, names and position of the menus, as well as the menu items for each menu structure, i.e., the number of menu items, the name of the menu items and the position of command names associated with the menu items. The configuration file may also contain keyword definitions that are used for highlighting, automatic indentation and outlining and may provide parameter names on pull-down menus for various parameters contained within a project specific and/or generic script command.

The script editor may utilize an include command to allow one script to pull in one or more other scripts and/or a pop-up window showing an outline of the commands in a current or new window. However, it should be appreciated that a primary advantage of the script editor is that it can be easily reconfigured via configuration file(s) defining menu command structures to support rapid script generation for a wide range of applications with arbitrary syntax. Thus, it should be understood that the universal script editor, according to the present invention, is applicable to almost any program/product that requires generation of text-based scripts and, more specifically, is applicable to the testing of any program/product that requires generation of text-based scripts.

According to the present invention, a user creates individual or multi-command script text files of an appropriate syntax for each command/function that a user supplied script interpreter engine can translate. As mentioned above, a configuration file defines the characteristics of the script language and may include location/names of the files containing the project specific and/or generic script command structures. Alternatively, or in addition, the command text can be contained directly within the configuration file. As mentioned above, a configuration file also includes a menu structure for the project and menu items for each menu structure. Further, a configuration file may include keyword definitions that are used for highlighting, automatic indentation and outlining and may include parameter names and provide pull-down menus for the various parameters contained within a project specific and/or generic script commands. Thus, a script editor application program constructed according to the present invention can be easily reconfigured based on read menu command structures to support rapid script generation for a wide range of applications with arbitrary syntax.

In its basic form, the universal script editor includes a read module to read in one or more configuration files and an editor module to support typical editor capabilities, e.g., cut, paste, font select, page number, column number, etc., plus connection to the menu structure to pull-in user defined templates, based on menu selections. The universal script editor may also include a support module to support miscellaneous other editor functions customized by the configuration file, such as, keyword highlighting, automatic indentation and outline viewing.

FIG. 1 depicts an exemplary computer system 100 that can be utilized to implement the present invention. As shown in FIG. 1, a processor 102 is coupled to a memory subsystem 104, which may include an application appropriate amount of volatile and non-volatile memory. The processor 102 is also coupled to an input device 110, a display 108 and a mass storage device 106, which may store an operating system, a script interpreter engine, a universal script editor and one or more configuration files. The mass storage device 106 may take any number of forms, such as a compact disc read-write memory (CD-RW) or a hard disk drive.

As is set forth below, an exemplary configuration file includes various menus and menu items, which may have a corresponding test program language file (e.g., a file with extension '.tpl') associated therewith:

```
- $TemplateDir ".\TPLfiles3\"
- $Menu "1553 Pri/Sec Cmds"
-    $Item "Set Chnl"              "SetChnl.tpl"
-    $Item "Create Msg"            "CreateMsg.tpl"
- $Menu "1553 Eng Cmds"
-    $Item "Engineering Status"    "EngTelm.tpl"
-    $Item "Eng Mem Write"         "EngMemWrite.tpl"
-    $Item "-"                     ""
- $ParamMenu "Telem Fields"
-    $ParamGrp "PriTlm:0--2"
-       $Param "Gimbal Rate"       "$PriTelm(GIMBAL_RATE)"
-       $Param "Gimbal Angle"      "$PriTelm(GIMBAL_ANGLE)"
-       $Param "Wheelspeed"        "$PriTelm(WHEEL_SPEED)"
-    $ParamGrp "PriTlm3:Oper Status"
-       $Param "Operating Mode"    "$PriTelm(OPER_MODE)"
-       $Param "SES   Spin Enabled" "$PriTelm(SES)"
- $Keywords "Abort" "SetChnl" "For+" "for+" "If+"
- $Keywords "-else+" "-endif" "-loop" "{+" "-}"
- $CommentStr "#"
```

The contents of an exemplary project specific .tpl file are set forth below:

```
SCRIPT FILE 'A' set ELStart(CELEO)              0 ;#1 = Clear event log event occurred flag
set ELStart(RM)                 0 ;#0 = stop on event 1 = start on event
;# the next three parameters are used only when RM = 1
set ELStart(RFST)               0 ;# 0 = from event 1 = from start
set ELStart(MEC)                0 ;# 0-7 multiple event counter
set ELStart(START_DELAY_TIME)   0 ;# 0-120 (resolution 0.5 seconds)
;# if RM = 0 then REC_TIME = length of time to record after trigger occurs
set ELStart(REC_TIME)           0 ;# 0-120 (resolution 0.5 seconds)
ELStart
```

As is shown above, the .tpl file is directed to a routine in the system-under-test that logs events.

The contents of another exemplary project specific .tpl file, with completely different syntax, which logs events, is shown below:

```
SCRIPT FILE 'B'

[Event log start]
   Clear event log event      = 0 ;boolean
   occurred flag
   Record mode                = 0 ;boolean
                                (0=Stop on Event, 1=Start on Event)
   Record from start time     = 0 ;boolean
   Multiple event counter     = 0 ;unsigned (0-7)
   Start delay time           = 0 ;unsigned (0-120, 0.5 sec lsb)
   Record time                = 0 ;unsigned (0-120, 0.5 sec lsb)
```

Figure 2:
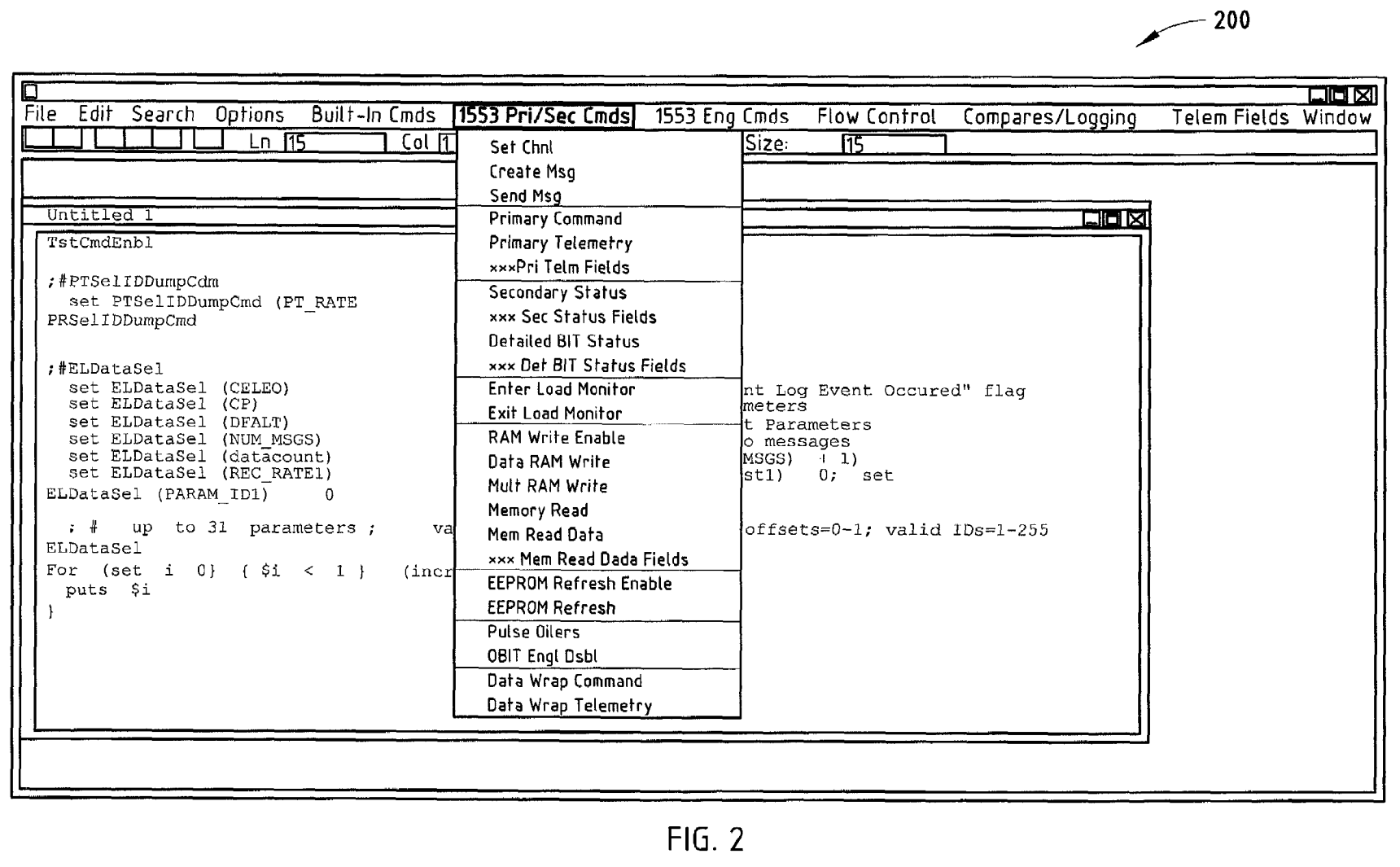

FIG. 2 depicts an exemplary screen dump of a menu 200 created from a configuration file similar to the above-referenced configuration file. As is shown in FIG. 2, the 1553 primary/secondary selectable commands allow a user to efficiently set up a test script and thereby initiate the performance of a number of tasks.

Figure 3:
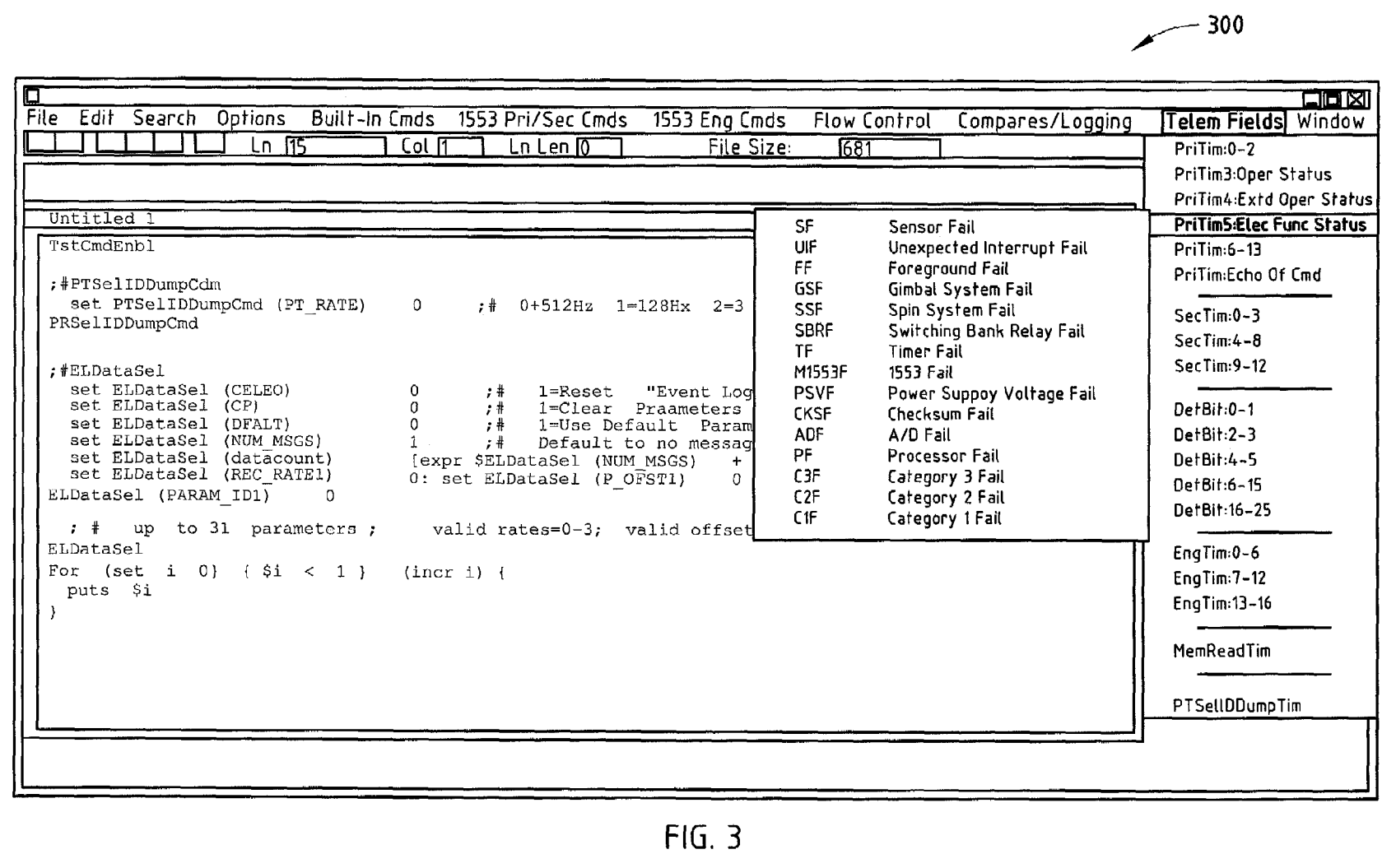

FIG. 3 depicts another exemplary screen dump 300 illustrating submenu items associated with a telemetry field item of a menu structure associated with a configuration file similar to the configuration file set forth above. As is shown in FIG. 3, the telemetry field items allows the user to efficiently examine the results of an executed test script and thereby perform analysis of the test. As is illustrated, the electrical functional status associated with a particular Primary Telemetry data word provides an indication of a sensor failure, an unexpected interrupt failure, a foreground failure, a gimbal system failure, a spin system failure, a switching bank relay failure, a timer failure, a 1553 failure, a power supply voltage failure, a checksum failure, an A/D converter failure, a processor failure, among other failures. Thus, it should be appreciated that depending upon the configuration file, a custom menu can be created that facilitates efficient and timely creation of scripts associated with an arbitrary syntax and the analysis of data provided through the execution of the scripts.

Figure 4:
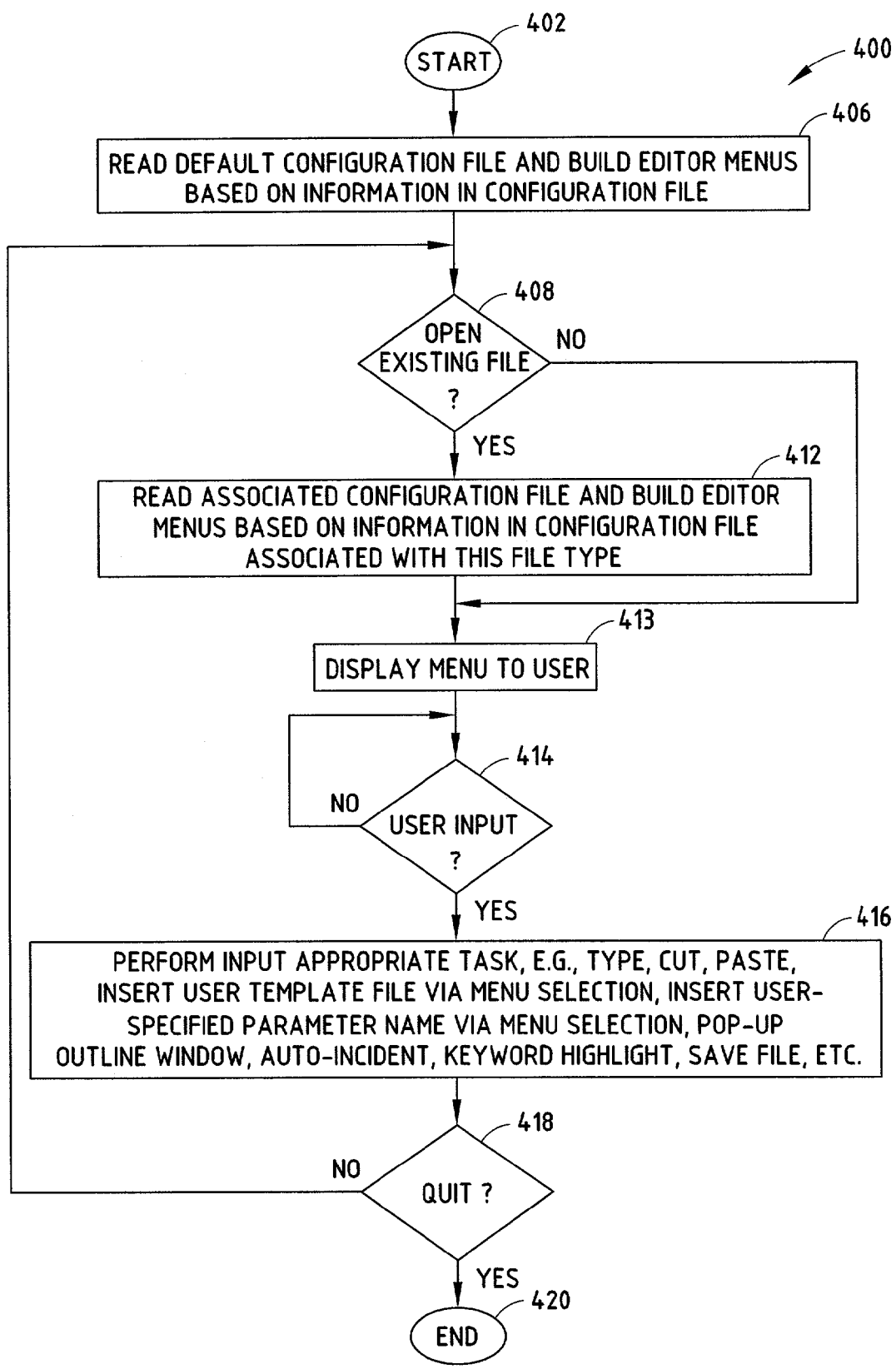
FIG. 4 is a flow diagram of an exemplary routine for providing menus, based upon one or more configuration files read into a universal script editor, to create scripts with arbitrary syntax, according to an embodiment of the present invention.

Turning to FIG. 4, an exemplary script editor routine 400 is illustrated. In step 402, processor 102 initiates execution of the routine 400, at which point control transfers to step 406. In step 406, the processor 102 reads in a project-specific default configuration file and builds editor menus and submenus based upon the default configuration file. Control then transfers to decision step 408. In step 408, the processor 102 determines whether the user has requested to open an existing file. If not, control transfers to step 413. Otherwise, control transfers to step 412, where an associated configuration file is read and the processor 102 builds editor menus and submenus based upon the configuration file associated with the file selected for opening. Control then transfers to step 413.

As previously discussed, the configuration file may include information such as location/name of a file containing a command script structure and/or the configuration file may include a command script structure. Further, the configuration file includes a menu structure and menu items for the menu structure and may include keyword definitions and parameters names. In step 413, the processor 102 causes the menus to be displayed to the user on the display 108, for example, a liquid crystal diode (LCD) display. Then, the processor 102 determines whether a user has provided input through input device 110, which may be, for example, a mouse, in decision step 414. If so, control transfers from step 414 to step 416, where the processor 102 performs an input appropriate task. Otherwise, control loops on step 414.

Following step 416, control transfers to decision step 418, where the processor 102 determines whether a user selected to quit the script building process. If so, control transfer to step 420 where the process terminates. Otherwise, control transfers to decision step 408 where another file can be opened, resulting in an appropriate configuration file being read to customize the script editor.

Accordingly, a universal script editor for creating scripts with arbitrary syntax has been described herein. As discussed, the universal script editor includes a read module for reading in one or more configuration files and setting up menu and data structures required to support editing functions for building scripts for a current project. The read module is in communication with an editor module that supports a plurality of editor capabilities, which are utilized to build the script for the current project.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An article of manufacture comprising a computer readable medium having embodied thereon a computer readable program for an universal script editor for creating scripts with arbitrary syntax, the article configured to be coupled to a computer having a processor, the computer coupled to a test object via a 1553 compatible computer interface, the computer readable program comprising:

one or more configuration files, each including a menu structure with associated menu items specific to a current project and a location/name of at least one file containing a script command structure comprising one or more test commands, the configuration file further including keyword definitions for defining a layout of the current project and parameter names for parameters in the current project;

a read module, configured to be executed by the processor, for reading in the one or more configuration files to determine the location/name of the file containing the script commands and retrieve the file to build the current project test script, wherein the one or more test script commands are configured to be sent over the 1553 compatible computer interface to the test object external to the computer, and wherein the read module sets up the menu structure which supports editing functions for building scripts for the current project based upon the configuration files definition and the one or more test commands;

an editor module, configured to be executed by the processor of the computer, the editor module in communication with the read module, the editor module supporting a plurality of editor capabilities which are utilized to build the current project scripts including reading in an user-defined template from the menu structure; and a miscellaneous support module, configured to be executed on the processor of the computer, the miscellaneous support module providing additional editor capabilities including keyword highlighting, automatic indentation and outline viewing using the keyword definitions.

2. The script editor of claim 1, wherein the editor capabilities include cutting, pasting, font selection, page numbering and column numbering functions.

3. The script editor of claim 1, wherein the editor module is in communication with the menu structure and retrieves templates responsive to a menu selection of the user.

4. The script editor of claim 1, wherein the script editor automatically associates configuration files and the associated menu structure with a type of file being edited.

5. The script editor of claim 1 wherein the menu structure further comprises a telemetry field item configured to be executed on the processor of the computer, the telemetry field item operable as menu commands to report results of the testing.

6. A computer system for creating scripts using a universal script editor, the system comprising:

a processor;

a 1553 compatible communication interface coupled to the processor and configured to interact with an external test object:

a display coupled to the processor;

an input device coupled to the processor; and a memory subsystem coupled to the processor, the memory subsystem storing code which includes:

one or more configuration files, each including a menu structure with associated menu items specific to a current project and a location/name of at least one file containing a script command structure comprising one or more test commands, the configuration file further including keyword definitions for defining a layout of the current project and parameter names for parameters in the current project;

a read module, executable by the processor, for reading in the one or more configuration files, determining the location/name of the file containing the script commands, and retrieving the file to build the current project test script, wherein the one or more test script commands are configured to be sent over the 1553 compatible computer interface to the external test object, and wherein the read module sets up a menu which supports editing functions for building scripts for the current project based on the configuration files definition and the one or more test commands;

an editor module in communication with the read module, the editor module when executed by the processor supporting a plurality of editor capabilities which are utilized to build the current project scripts including reading in an user-defined template from the menu structure; and a miscellaneous support module, configured to be executed on the processor of the computer, the miscellaneous support module providing additional editor capabilities including keyword highlighting, automatic indentation and outline viewing using the keyword definitions.

7. The system of claim 6, wherein the editor capabilities include cutting, pasting, font selection, page numbering and column numbering functions.

8. The system of claim 6, wherein the editor module is in communication with the menu structure and retrieves templates responsive to a menu selection of the user.

9. The system of claim 6, wherein the script editor automatically associates configuration files and the associated menu structure with a type of file being edited.

10. The system of claim 6 wherein the menu structure further comprises a telemetry field item configured to be executed on the processor of the computer, the telemetry field item operable as menu commands to report results of the testing.

11. An article of manufacture comprising a computer readable medium having embodied thereon a computer readable program for an universal script editor for creating scripts with arbitrary syntax, the article configured to be coupled to a computer having a processor, the computer coupled to a test object via a 1553 compatible communication interface, the computer readable program comprising:

one or more configuration files, each including a menu structure with associated menu items specific to a current project and a location/name of at least one file containing a script command structure comprising one or more test commands, the configuration file further including keyword definitions for defining a layout of the current project and parameter names for parameters in the current project;

a read module, configured to be executed on the processor, for reading in the one or more configuration files to determine the location/name of the file containing the script commands, retrieve the file to build the current project test script, and send the one or more test script commands over the 1553 compatible communication interface, wherein the read module sets up the menu structure which supports editing functions for building scripts based on the configuration files definition, for running testing procedures on test objects external to the processor; and an editor module, configured to be executed on the processor of the computer, the editor module in communication with the read module, the editor module supporting a plurality of editor capabilities which are utilized to build the current project scripts;

a miscellaneous support module, configured to be executed on the processor of the computer, the miscellaneous support module providing additional editor capabilities including keyword highlighting, automatic indentation and outline viewing using the keyword definitions.

12. The script editor of claim 11, wherein the editor capabilities include cutting, pasting, font selection, page numbering and column numbering functions.

13. The script editor of claim 11, wherein the editor module is in communication with the menu structure and retrieves templates responsive to a menu selection of the user.

14. The script editor of claim 11, wherein the script editor automatically associates configuration files and the associated menu structure with a type of file being edited.

15. The script editor of claim 11 wherein the menu structure further comprises a telemetry field item configured to be executed on the processor of the computer, the telemetry field item operable as menu commands to report results of the testing.

* * * * *